Jan. 29, 1929.　　　　F. E. BROWNE　　　　1,700,485
HALF HOSE GARTER
Filed May 5, 1925

Freleigh E. Browne
INVENTOR

BY Frank T. Wentworth
his ATTORNEY.

Patented Jan. 29, 1929.

1,700,485

UNITED STATES PATENT OFFICE.

FRELEIGH E. BROWNE, OF RIDGEFIELD PARK, NEW JERSEY.

HALF-HOSE GARTER.

Application filed May 5, 1925. Serial No. 28,075.

The invention relates to half hose garters of the type described in my co-pending application Serial No. 683,555, (Patent No. 1,536,472) and wherein the construction is such that a desired flexibility in the garter is secured without the use of elastic webbing or cords such as are customarily used in garters.

By my present invention, I am enabled to so construct a garter that the non-elastic webbing will be so positioned with relation to the non-flexible devices for permitting the automatic adjustment of the length of the leg strap, as to form a pad which will protect the skin of the wearer from any rubbing contact with these parts and yet permit adjustment in the length of the leg strap to secure the desired fitting thereof to the wearer.

In addition to so forming the automatic adjusting mechanism, I also so connect the clasp with this mechanism that a similar pad will be presented therein for a similar purpose. By this construction, if desired, metallic fittings may be used, although I prefer to use non-metallic fittings such as celluloid to permit the washing of the garters, if desired, without likelihood of corroding these fittings.

The construction of a garter embodying my invention is such as to simplify its assembly, particularly as to the pivotal connection between the plate of the automatic adjustment mechanism which is carried by a looped portion of the leg strap, and a pivotal plate forming a part of this fitting, since the non-elastic web itself will form a protecting shield between the pivot connecting said plate and the wearer.

The invention consists primarily in a half hose garter embodying therein a plate having slots adjacent the opposite edges thereof, a lever plate having two arms pivoted intermediate said arms to said slotted plate intermediate said slots, a clasp connected to one of the arms of said lever plate, a leg strap, means forming a loop therein which is passed through said slots in said slotted plate so that a portion of the loop will be presented between said plate and the wearer, and cooperating connecting members upon the other arm of said lever plate and the free end of said leg strap; and in such other novel features of construction and combination of parts as are hereinafter set forth and described, and more particularly pointed out in the claims hereto appended.

Referring to the drawings.

Like letters refer to like parts throughout the several views.

Figure 1:
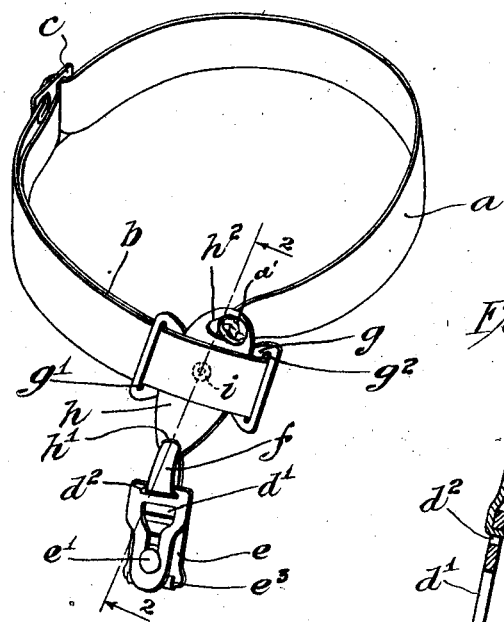
Fig. 1 is a perspective view of a garter embodying my invention.
Figure 3:
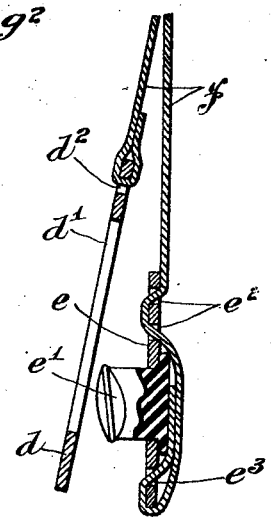
Fig. 3 is a vertical cross-sectional view through the clasp.

In the embodiment of my invention shown in the drawings, I employ a leg strap $a$ which may be composed of fabric webbing, leather or any other material not having incorporated therein rubber or rubber threads for the purpose of imparting elasticity thereto. The less stretch there is to the material of this strap, the more desirable it is for the purposes of my invention, the absence of excessive stretch, or of an elastic substance therein, avoiding the frequent readjustment in the length of the strap, and prolonging the life of the article while permitting it to be washed, if desired.

Formed at one end of this strap is a loop $b$, which, because of the absence of elasticity in the strap, is preferably formed by means of an adjustable, or takeup, attachment $c$ which may be similar to that now commonly used in garters for half hose.

At $d$ I have shown a clasp for attachment to half hose, the operation of which is similar to that commonly used, but the construction of which differs therefrom since the clasp is composed of two members, the outer of which, $d'$, is provided with the ordinary slot for engagement with a button $e'$, and the inner of which, $e$, carries said button. The member $d'$ has a slot therein $d^2$, through which the end of a tape $f$ is passed and secured upon itself, the other end of this tape being passed through a double slot $e^2$ at the top of the part $e$; below this plate; and through a slot $e^3$ at the bottom or other end of the plate $e$, and secured upon itself so as to form a pad of the tape back of the plate which will be interposed between the plate and the wearer. Thus not only is the wearer protected from rubbing contact with the plate, but the mounting of the button $e'$ upon the plate $e$ is facilitated, and the use of a soft rubber faced button for this purpose is permitted.

Carried by the looped portion $b$ of the strap $a$ is an automatic adjusting mechanism consisting of a non-flexible plate $g$ which, although preferably formed of celluloid, may be made of metal if desired. This plate has slots adjacent the opposite ends thereof through which the material of the loop $b$ passes so as to bring different portions of this loop upon opposite sides of said plate, and thus cause the material of the loop to be interposed between said plate $g$ and the wearer. The slots through which said loop passes are indicated at $g'$—$g^2$ in Fig. 1 of the drawings, the strap having a free running fit in said slots for the purpose of facilitating the adjustment of the length of the leg strap by means of the takeup attachment $c$.

Figure 2:
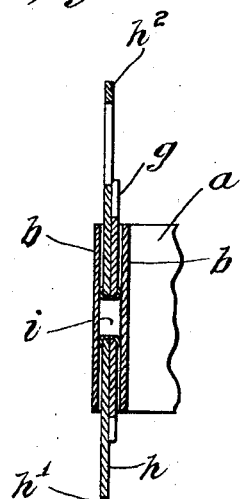
Fig. 2 is a section on the line 2—2 of Fig. 1 upon an enlarged scale.

Pivotally mounted upon the plate $g$, and between it and the outer reach of the loop $b$, is a lever plate $h$ the means of connection between these plates preferably being a hollow pivot $i$ as shown more particularly in Fig. 2, although any other desired type of pivotal connection may be used. The interposition of a portion of the looped portion $b$ of the strap $a$ between the plate $g$ and the wearer permits the use of a metallic pivot at this point since this pivot cannot under any circumstances contact with the wearer.

One arm of the lever plate $h$ is pierced as at $h'$ to receive the tape $f$, and the other arm thereof is provided with a loop $h^2$ adapted to co-operate with a button forming a hook $a'$ at the free end of the leg strap $a$. The exact construction shown is a desirable form for the co-operating members by which the free end of the strap $a$ may be connected with the lever plate $h$, but other forms of connection may be used, particularly in view of the fact that the plate $g$ and the pad formed rearwardly thereof by the looped portion $b$ will space the plate $h$ away from the wearer sufficiently to hold the connecting means away from the wearer.

From the foregoing description it will be observed that while the plates $g$ and $h$ are inclosed by the material of the strap $a$ in a manner to form pads of this material upon opposite sides of the automatic adjusting mechanism which is comprised of these parts, free oscillation of the lever plate $h$ is permitted. The formation of these pads by the material of the strap $a$ not only simplifies the production of the article, but facilitates the connection of the two plates since a metallic pivot may be used at this point if desired, or metallic plates may be used since these plates are held by the material of the strap away from the wearer sufficiently to prevent undesirable results following from their contact with the wearer.

Since the clasp $d$ is carried only by the lever plate $h$, it is apparent that with the movements of the wearer resulting in the flexing of the leg muscles, the plate $g$ will have no turning movement, such movement being limited to the lever plate $h$.

A half hose garter embodying my invention when in use will automatically adjust itself to the wearer, notwithstanding constant movements of the leg muscles due to changes of posture.

In the event of the enlargement of the leg, the strain upon the strap $a$ will cause the plate $h$ to swing about the pivot $i$, and thus exert an upward pull upon the tape $f$, the movement of the lever resulting in sufficient enlargement in the bight of the strap taken about the leg to relieve pressure upon the leg. A downward pull upon the tape $f$ when the muscles of the leg are relaxed will cause a reverse pivotal movement of the lever $h$, thus taking up the bight in the strap or about the leg and adjusting the strap $a$ to the leg of the wearer. The stresses applied to the tape $f$ will result from elasticity inherent to the knitted fabric of half hose.

It will be readily understood that the movements of the lever plate $h$ are not sufficiently great to cause more than a slight increase or decrease in the dimensions of the bight formed in the leg strap, this, however, being sufficient to prevent accidental displacement of the garter or the disengagement of the connecting members $h^2$ and $a'$ between said lever plate and the end of the strap, and discomfort to the wearer through stricture of the leg.

The manner of forming the clasp $d$ and securing the tape $f$ thereto will form an effective pad, the tape $f$ presenting sufficient flexibility to readily permit the clasp to be adjusted to or removed from the half hose.

It is not my intention to limit the invention to the precise configuration of the plate $g$ and the lever plate $h$, to the particular form of clasp, or leg strap adjusting device, nor to the particular form of connections between the leg strap and the lever plate, since it is apparent that such may be varied while still preserving the essential characteristics of the garter.

Having described the invention, what I claim as new and desire to have protected by Letters Patent, is:—

1. A half hose garter embodying therein a plate having slots adjacent the opposite edges thereof, a lever plate having two arms pivoted intermediate said arms to said slotted plate intermediate said slots, a clasp connected to one of the arms of said lever plate, a leg strap, means forming a loop therein which is passed through said slots in said slotted plate so that a portion of the loop will be presented between said plate and the wearer, and co-operating connecting members upon the other arm of said lever plate and the free end of said leg strap.

2. A half hose garter embodying therein a plate having slots adjacent the opposite edges thereof, a lever plate having two arms pivoted intermediate said arms to said slotted plate intermediate said slots, a clasp connected to one of the arms of said lever plate, a leg strap, an adjustable takeup attachment co-operating with said strap to form a loop therein which is passed through said slots in said slotted plate so that a portion of the loop will be presented between said plate and the wearer and permit the length of said loop to be varied to adjust said strap to the leg of the wearer, and co-operating connecting members upon the other arm of said lever plate and the free end of said leg strap.

3. A half hose garter embodying therein a plate having slots adjacent the opposite edges thereof, a lever plate having two arms pivoted intermediate said arms to said slotted plate intermediate said slots, a clasp connected to one of the arms of said lever plate, a leg strap, means forming a loop therein which is passed through said slots in said slotted plate so that portions thereof are positioned upon opposite sides of said slotted plate and said lever plate, whereby one portion of the loop will be presented between said plate and the wearer, and another portion thereof will be interposed between the pivot of said lever plate and the garments of the wearer, and co-operating connecting members upon the other arm of said lever plate and the free end of said leg strap.

4. A half hose garter embodying therein a plate having slots adjacent the opposite edges thereof, a lever plate having two arms pivoted intermediate said arms to said slotted plate intermediate said slots, a clasp connected to one of the arms of said lever plate, a leg strap, an adjustable takeup attachment co-operating with said strap to form a loop therein which is passed through said slots in said slotted plate so that portions thereof are positioned upon opposite sides of said slotted plate and said lever plate, whereby one portion of the loop will be presented between said plate and the wearer, and another portion thereof will be interposed between the pivot of said lever plate and the garments of the wearer and permit the length of said loop to be varied to adjust said strap to the leg of the wearer, and co-operating connecting members upon the other arm of said lever plate and the free end of said leg strap.

5. A half hose garter embodying therein a plate having slots adjacent the opposite edges thereof, a lever plate having two arms pivoted intermediate said arms to said slotted plate intermediate said slots, a clasp connected to one of the arms of said lever plate, a leg strap, means forming a loop therein which is passed through said slots in said slotted plate so that a portion of the loop will be presented between said plate and the wearer, a loop at the end of the other arm of said lever plate, and a button secured to the free end of said leg strap and adapted to engage said loop.

6. A half hose garter embodying therein a plate having slots adjacent the opposite edges thereof, a lever plate having two arms pivoted intermediate said arms to said slotted plate intermediate said slots, a clasp comprising a member having a button and slots therein upon opposite sides of said button, a tape passing through said slots passing rearwardly of said button and said plate and between same and the wearer and connected to one of the arms of said lever plate, and a slotted member movably mounted in relation to said member and adapted to co-operate with said button, a leg strap, means forming a loop therein which is passed through said slots in said slotted plate so that portions thereof are positioned upon opposite sides of said slotted plate and said lever plate, whereby one portion of the loop will be presented between said plate and the wearer, and another portion thereof will be interposed between the pivot of said lever plate and the garments of the wearer, a loop at the end of the other arm of said lever plate, a button secured to the free end of said leg strap and adapted to engage said loop, and a takeup attachment co-operating with said strap whereby the length of said loop may be varied to adjust said strap to the leg of the wearer.

In witness whereof I have hereunto affixed my signature, this 13th day of April, 1925.

FRELEIGH E. BROWNE.